April 29, 1969 J. L. RAWSON 3,441,039
SPEED CONTROL MONITOR

Filed Jan. 17, 1966 Sheet 1 of 3

INVENTOR:
JAMES L. RAWSON
BY
Dawson, Tilton, Fallon, Lungmus & Alexander
ATT'YS

April 29, 1969  J. L. RAWSON  3,441,039
SPEED CONTROL MONITOR
Filed Jan. 17, 1966  Sheet 3 of 3

INVENTOR:
JAMES L. RAWSON
BY
Dawson, Tilton, Fallon, Lungmus & Alexander
ATT'YS

United States Patent Office 3,441,039
Patented Apr. 29, 1969

3,441,039
SPEED CONTROL MONITOR
James L. Rawson, Cedar Rapids, Iowa, assignor to Highway Equipment Company, Cedar Rapids, Iowa, a corporation of Iowa
Filed Jan. 17, 1966, Ser. No. 521,128
Int. Cl. F01b 25/06; B05b 9/06; B65g 67/24
U.S. Cl. 137—30                                           3 Claims

ABSTRACT OF THE DISCLOSURE

A control system is described for regulating the distribution of material from a storage hopper carried by a moving vehicle. A hydraulic motor controls the flow of material from the hopper; and first and second flexible links are rotated at speeds representative respectively of the ground speed of the vehicle and the speed of the hydraulic feed motor. A speed differential response mechanism converts the difference in angular velocity of the two flexible cables to linear motion. A link responsive to the linear motion of the speed-differential responsive mechanism controls a valve interposed in the feed line to the hydraulic motor to regulate the speed of the hydraulic feed motor as a function of the difference between ground speed and the speed of the hydraulic feed motor so that the distribution of material is controlled by the ground speed of the vehicle.

This invention relates to a speed control monitor, and, more particularly, to means for controlling the dispensing of material as a function of vehicle advance. As such, the invention finds utility in the dispensing of fertilizer, sand, salt (for roads), liquid asphalt, weed killer, etc.

In the past, the means for controlling the dispensing of liquid and solid materials according to the speed of the dispensing vehicle across the ground has uniformly been achieved through deriving both the controlling signal and the torque from the propelling vehicle, i.e., from the power take-off, the transmission, the traction wheel, and the like. This has meant that virtually no control is possible without going to a complicated reduction system, and uniformly those in the trade have regulated the dispensing by adjustable gates used in conjunction with the output conveyor or auger. All of these limitations are avoided by the instant invention, and the provision of a novel monitoring device for installations such as those mentioned above constitutes an important object of this invention.

The invention is described in conjunction with an illustrative embodiment in the accompanying drawing, in which FIG. 1 is a perspective view of the invention shown installed on a truck, the truck and its associated body being shown in phantom line;

Figure 1:
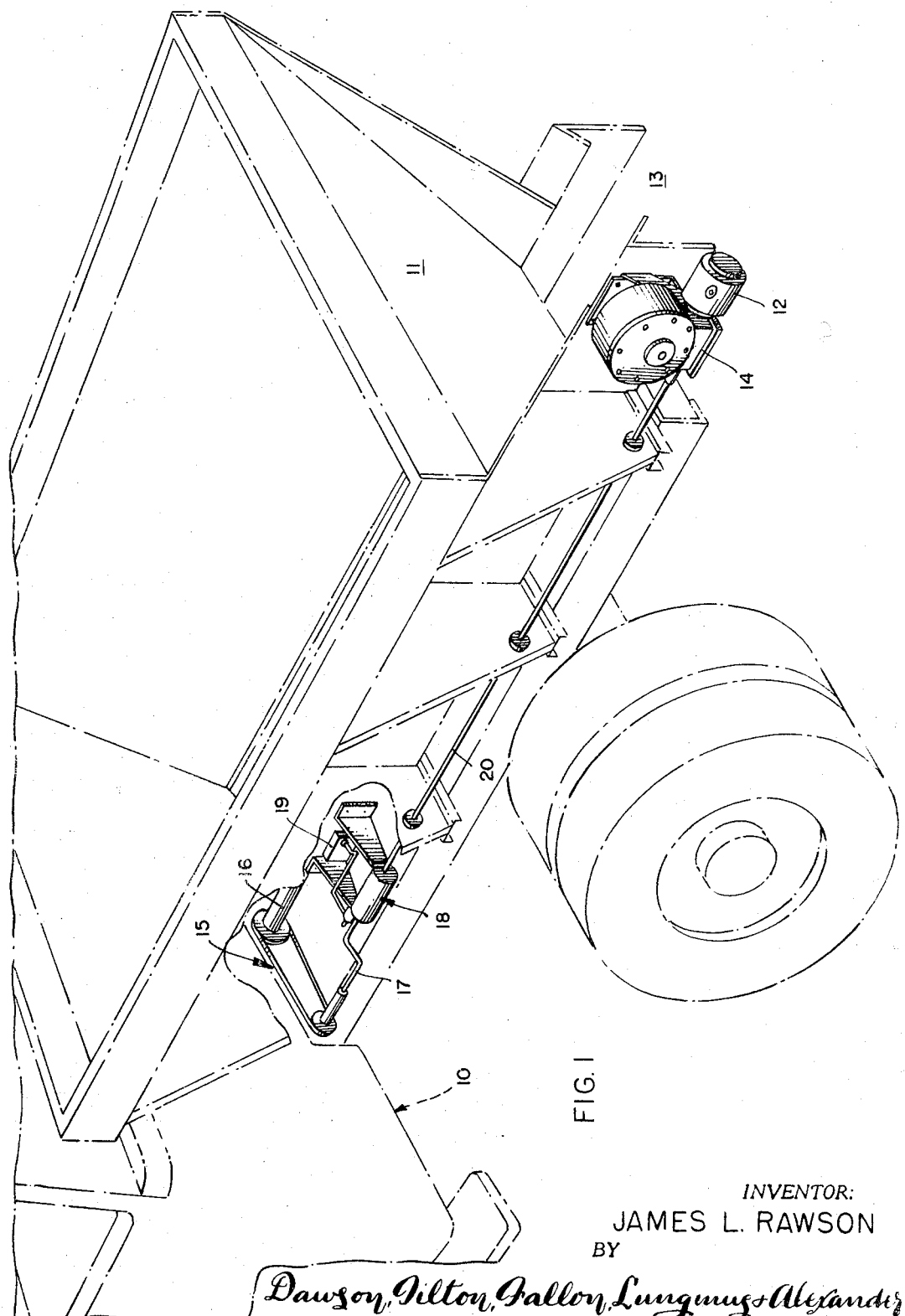

In the illustration given and with reference to FIG. 1, the numeral 10 designates generally a truck (shown in phantom line) which carries the usual hopper-shaped box 11. The box 11 is equipped with a bottom conveyor (not shown) driven by a hydraulic motor 12 adapted to dispense material from the rear of the box in the area designated 13. The numeral 14 in FIG. 1 (adjacent the hydraulic driving motor 12) is a gear reducer and right-angled drive arrangement conventionally employed in this art.

The invention has to do with controlling the conveyor speed, i.e., the speed of the hydraulic motor 12, as a function of the ground speed of the truck 10. In one aspect, this is achieved by a belt and pulley arrangement generally designated 15, which is seen to interconnect the truck drive line 16 with a flexible cable 17. The flexible cable 17 leads to a monitor device generally designated 18 and which is seen in greater detail in FIGS. 4 and 5. The monitor device 18 gives an output signal (in the illustration given in FIG. 1) to a hydraulic fluid power delivered to the motors 12. The output of the hydraulic motor 12, in addition to going to the reducer and drive 14, is transmitted along a second flexible cable 20 to the monitor device 18. Thus, the monitor device 18 compares the two inputs (the cables 17 and 20) and adjusts the valve 19 accordingly so as to achieve an identity of speeds.

Figure 2:
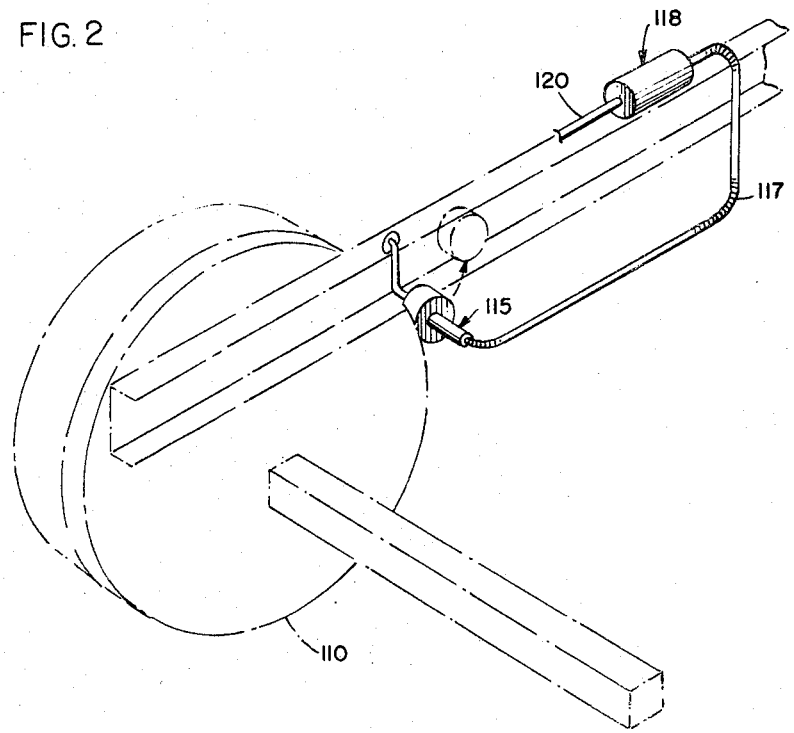
FIG. 2 is a fragmentary perspective view, partially in solid line and partially in dotted line, wherein an alternative form of deriving a sensible signal from the propelling truck is shown.

An alternative arrangement for deriving the sensible signal from the truck is shown in FIG. 2, wherein the monitor 118 is seen to be connected by means of a flexible cable 117 to a traction wheel generally designated 115 and which is adapted to bear against one of the truck rear wheels as at 110. Thus, a sensible signal corresponding to the speed of the truck wheel 110 is delivered to the monitor 118. Also shown in fragmentary form is a flexible cable 120 which performs the same function as the cable 20 in FIG. 1.

Figure 3:
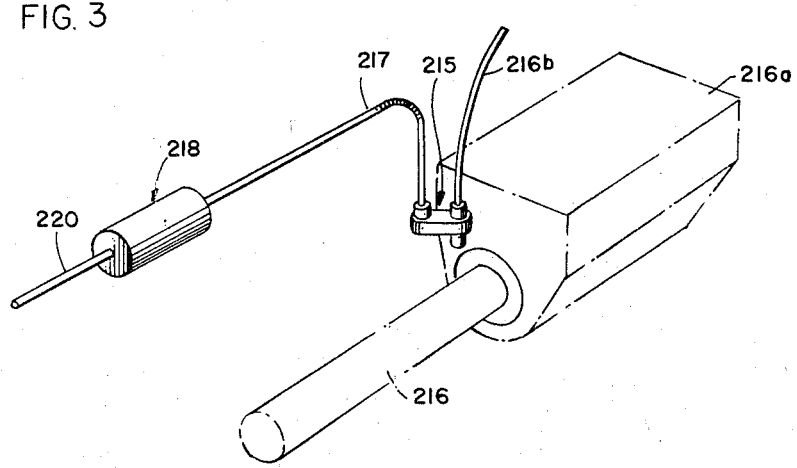
FIG. 3 is a fragmentary perspective view in both solid and phantom line showing another form of signal derivation.

Still another satisfactory arrangement for deriving sensible signals from a propelling vehicle is seen in FIG. 3, wherein the monitor is designated generally by the numeral 218 and is coupled by means of a flexible cable 220 to the hydraulic motor (not shown) and by means of a second flexible cable 217 to a speedometer outlet generally designated 215 and which is seen to be mounted on the truck transmission 216a associated with the truck drive 216. In the illustration given in FIG. 3, the numeral 216b represents the speedometer cable to the truck speedometer, and the information delivered to the monitor 218 is via a double outlet box provided as part of the speedometer outlet.

Figure 4:
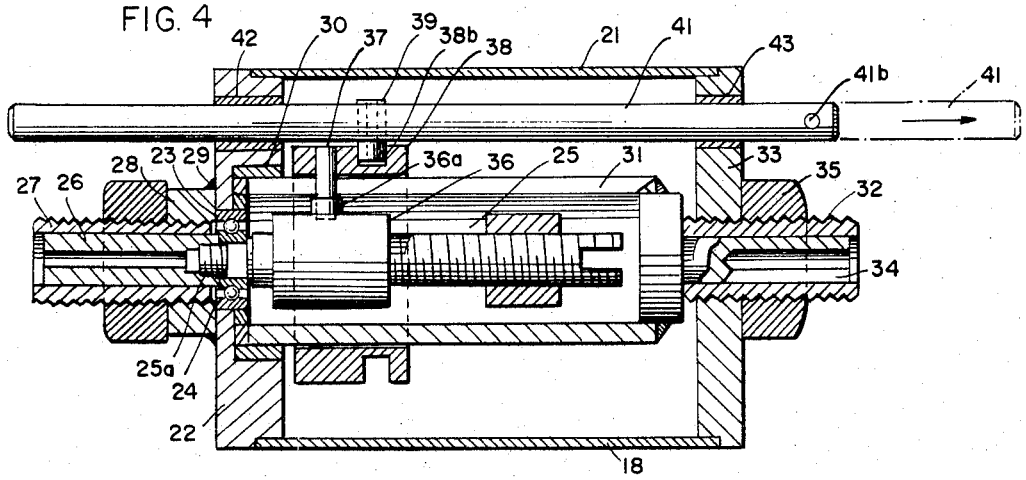
FIG. 4 is a sectional view of the monitoring device used in the practice of the invention.

Turning now to FIG. 4, the monitor 18 is seen to include a tubular casing or housing 21. Each of the elements described in conjunction with FIG. 4 can be seen in spaced-apart condition from the remaining elements by reference to FIG. 5.

Figure 5:
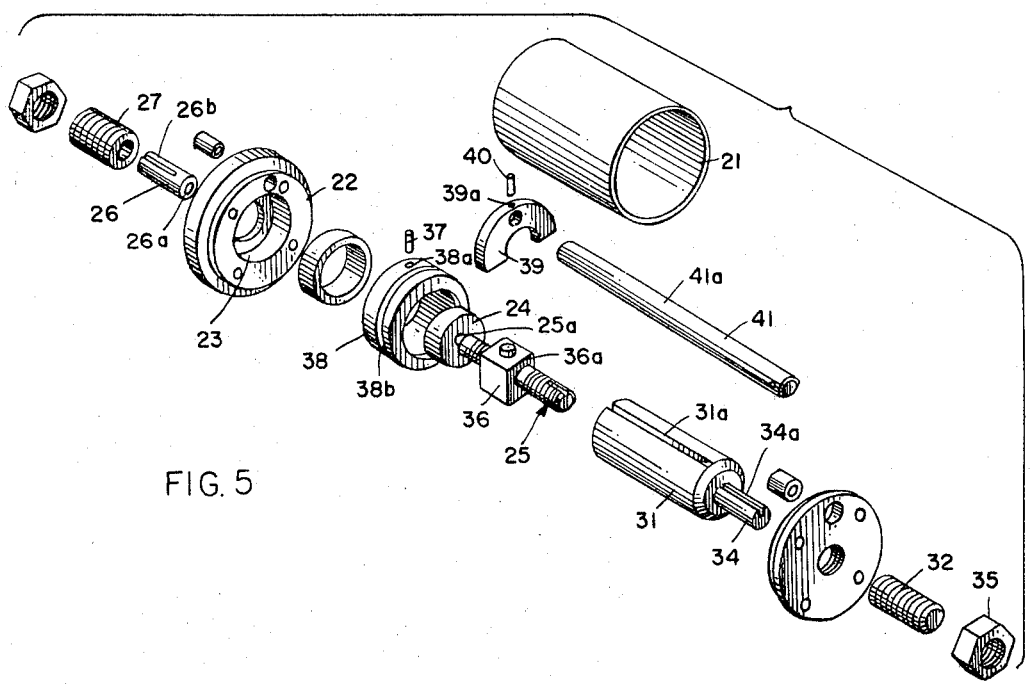
FIG. 5 is an exploded perspective view of the device seen in FIG. 4.

Referring now to the left-hand portions of FIGS. 4 and 5, it will be seen that the end of the casing 21 is closed by means of an end cap 22. The end cap 22 has a central opening as at 23 for the receipt of a roller bearing 24. Roller bearing 24 rotatably supports a frictionless screw generally designated 25 and which is adapted to be connected at its left-hand end (intermediately) to the flexible cable 17, 117, 217, as the case may be. In other words, the sensible signal from the propelling vehicle is delivered to the left-hand end of the screw 25.

For this purpose, the threaded end portion 25a of the frictionless screw 25 is threadedly received within an input shaft 26. The input shaft 26 is equipped with internal threads as at 26a (see FIG. 5), and is rotatably mounted within a bushing 27. The bushing 27 is secured in place by means of a locknut 28 welded to the end cap 23 as at 29. The slot 26b in the input shaft 27 develops a clamping action about the flexible cable 17, 117, etc. so as to communicate the sensible signal from the signalling means 15 to the frictionless screw 25. Also mounted within the end cap 22 is a bushing 30 (concentric with the opening 23) and which rotatably supports one end of a bridle tube 31. The other end of the bridle tube is supported within a bushing 32 threadedly received within a right end cap 33. The end caps 22 and 33 are suitably secured to the housing 21 in fluid-tight relation so that oil may be contained within the housing 21 to lubricate the various parts. The portion 34 of the bridle tube 31 that is supported within the portion 32 is slotted as at 20 in FIG. 1. The bushing 32 is confined in place by means of a jam nut 35 (see also FIG. 5).

Threadedly mounted on the frictionless screw 25 is a nut 36 equipped with an upstanding annular boss 36a. Projecting upwardly (as shown) from the boss 36a is a transfer pin 37. The transfer pin 37 is received within a longitudinally-extending slot 31a of the bridle tube 31. Thus, when the speed of the propelling vehicle and the speed of the servo hydraulic motor are the same, the motion imparted to the nut 36 by means of the bridle tube 31 will exactly compensate for the rotational movement afforded the screw 25, causing the nut 36 to remain in place.

When there is a change of speed of the propelling vehicle, the frictionless screw 25 will turn faster of slower, as the case may be, and this will result in an initial rotary movement of the nut 36 and arcuate displacement of the transfer pin 37. The transfer pin 37 is also received within a slot 38a of a slip collar 38, so that any movement of the transfer pin results in corresponding rotational movement of slip collar 38. The slip collar 38 additionally is angularly recessed as at 38b for the receipt of a yoke 39. The yoke 39 is apertured as at 39a for the receipt of a lock pin 40. The lock pin in turn is received within an opening 41a of an output control shaft 41. The shaft 41, as is readily seen from a consideration of FIG. 4, is supported within bushings 42 and 43 provided in the end caps 22 and 33, respectively.

OPERATION

It will be appreciated that as the nut 36 rotates, the slip collar 38 will rotate with it. Inasmuch as the yoke 39 is fixed against rotational movement, the yoke moves the output control shaft linearly to the right or left (as, for example, to the dotted line position designated 41' in FIG. 4), under the influence of the yoke 39 and pin 40. The shaft 41 is operably associated, as by means of a pin (not shown) extending through a transverse opening 41b for controlling the hydraulic valve 19. Through this means, the valve is opened or closed to increase or decrease fluid flow to the hydraulic servo motor 12, and thus return the nut 36 (by virtue of the movement of the bridle tube 31).

While in the foregoing specification, a detailed description of the invention has been set down for the purpose of illustration, many variations in the details herein given may be made by those skilled in the art without departing from the spirit and scope of the invention.

I claim:

1. A system for controlling the distribution of material from a storage hopper carried by a moving vehicle comprising a hydraulic feed motor for controlling the flow of material from siad hopper, first flexible link means coupled to said hydraulic motor for rotating at a speed representative of the operating speed of said hydraulic motor, valve means for controlling the flow of liquid to said hydraulic motor to set the speed thereof, second flexible link means on said vehicle rotating at a speed representative of the ground speed of said vehicle, a screw driven in rotary motion by one of said flexible link means, a nut threaded on said screw and driven in rotary motion in the same direction as said screw by the other of said flexible links whereby the linear movement of said nut along said screw is representative of a difference in speed between said vehicle and said hydraulic motor, and link means connected to said nut for controlling said valve to regulate the flow of liquid to said hydraulic motor responsive to the movement of said nut to drive said hydarulic motor so that said first and second link means rotate at the same angular velocity.

2. The system of claim 1 further comprising a bridle tube mounted co-axially with said screw and defining a longitudinal slot, means directly connecting said bridle tube to said other flexible link to rotate therewith, and a pin in said nut and extending into said slot to rotate said nut with said bridle tube whereby said pin traverses said slot when said first and second flexible links are rotating at different speeds.

3. The structure of claim 2 wherein said link means comprises a yoke rotatably mounted about said bridle tube and connected to said pin attached to said nut, rod means connected to said yoke for linear motion with said nut, and a link interconnecting said rod with said valve to control fluid through the same.

References Cited

UNITED STATES PATENTS

| 979,802 | 12/1910 | Sahlin | 137—48 |
| 2,468,459 | 4/1949 | Pearce | 137—27 |
| 2,761,669 | 9/1956 | Hamill | 137—30 X |
| 2,874,711 | 2/1959 | Anxionnaz | 137—48 X |
| 3,233,832 | 2/1966 | Hallberg | 137—53 X |

CLARENCE E. GORDON, Primary Examiner.

U.S. Cl. X.R.

239—155; 214—58; 137—48, 47; 103—35